Figure 1:
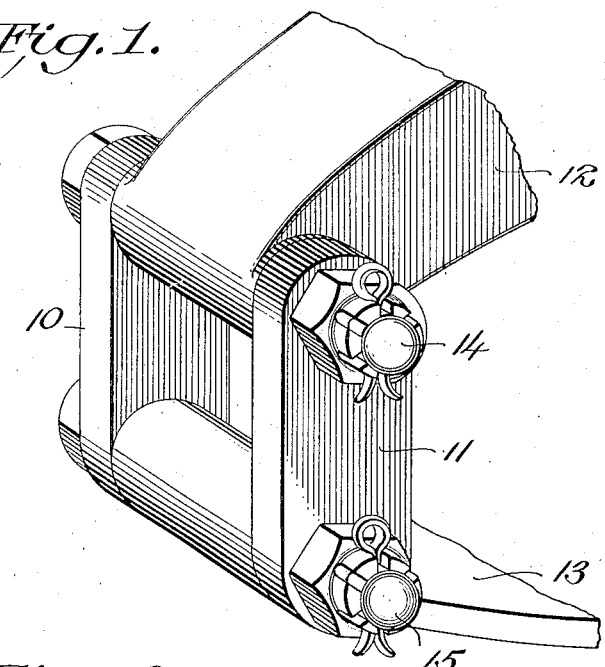

March 18, 1924.

D. F. ASBURY 1,487,427

SPRING SHACKLE

Filed Feb. 9, 1922

2 Sheets-Sheet 1

Inventor
D. F. Asbury,
BY Bright & Bailey
Attorneys

March 18, 1924.
D. F. ASBURY
1,487,427
SPRING SHACKLE
Filed Feb. 9, 1922
2 Sheets-Sheet 2
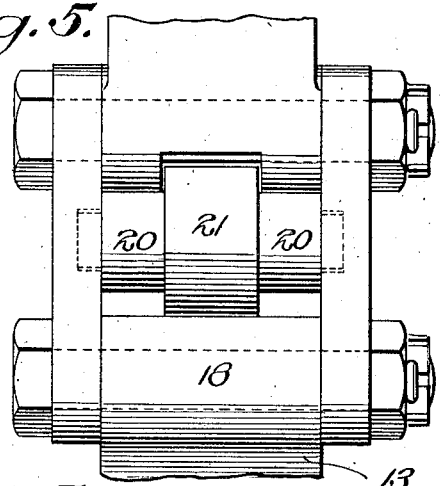
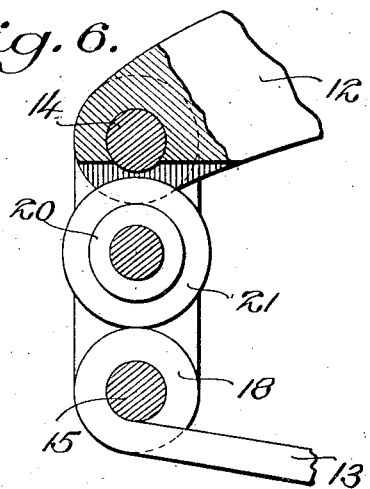
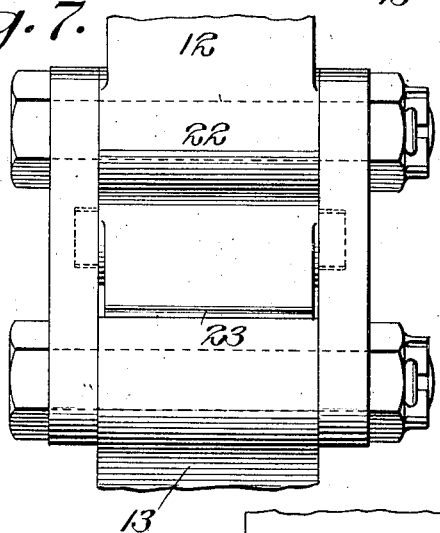
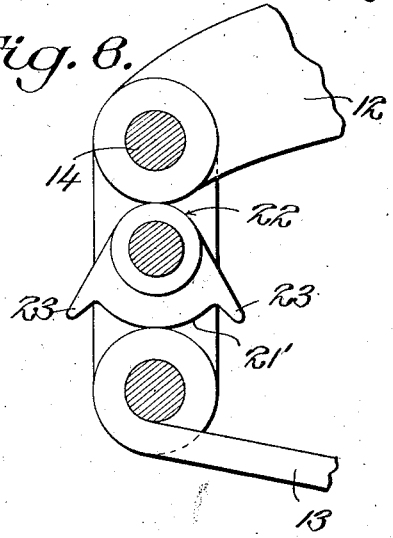
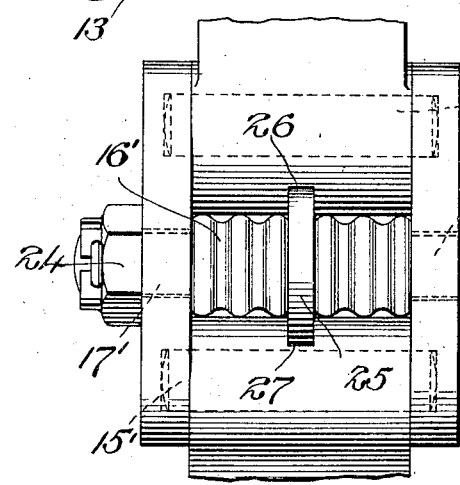
Inventor
D. F. Asbury,
By Bright & Bailey
Attorneys Patented Mar. 18, 1924.

1,487,427

UNITED STATES PATENT OFFICE.

DORSEY F. ASBURY, OF WASHINGTON, DISTRICT OF COLUMBIA.

SPRING SHACKLE.

Application filed February 9, 1922. Serial No. 535,309.

*To all whom it may concern:*

Be it known that I, DORSEY F. ASBURY, a citizen of the United States, and resident of Washington, in the District of Columbia, have invented certain new and useful Improvements in Spring Shackles, of which the following is a specification.

My invention relates to spring devices and has particular reference to improvements in spring-shackles of the type commonly employed for connecting the ends of semi-elliptic springs to the frames of vehicles.

One extensively used form of spring shackle of the type mentioned consists of a pair of strap members adapted to be arranged in embracing relation with respect to a vehicle frame and a semi-elliptic spring and adapted to have a pair of bolts passed through the ends thereof and through the frame and spring, respectively whereby the spring is flexibly connected to the frame for the purpose of allowing it to yield freely under conditions of use. It is well known, however, that spring shackles of this form are constantly under great stress as the entire load of the vehicle is transmitted to the springs through said bolts and straps and as a consequence they soon become worn to such an extent as to be in danger of breaking, while the relative movement between the parts permitted by wear eventually results in rattle, squeaks and other disagreeable noises.

The bolts of most spring-shackles are hardened in process of manufacture and are provided with bushings which are arranged between the bolts and the frame and springs respectively, to thereby delay excessive wear with its resultant disadvantages, but despite these provisions, which are beneficial to the extent that they prolong the time when the parts become excessively and dangerously worn, the latter condition ultimately results and necessitates the replacement of all parts of the shackles at relatively high cost.

My present invention aims at the provision of an arrangement which will eliminate stress on the straps and bolts and thereby prevent wear of these parts, to the end that bushings may be dispensed with and soft bolts used instead of hardened ones, whereby expensive hardening processes in the manufacture of the latter may be avoided. At the same time it is my purpose to eliminate the necessity of replacing parts, to render lubrication unessential, and to prevent disagreeable squeaks and rattles.

With the foregoing and other purposes in view, my invention consists in the novel features of construction, combination and arrangement of parts as will be hereinafter more fully described, illustrated in the accompanying drawings and claimed.

In the drawings, wherein like characters of reference denote corresponding parts in the different views—

Figure 2:
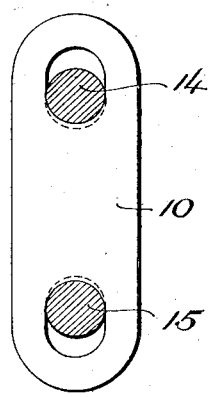
Figure 3:
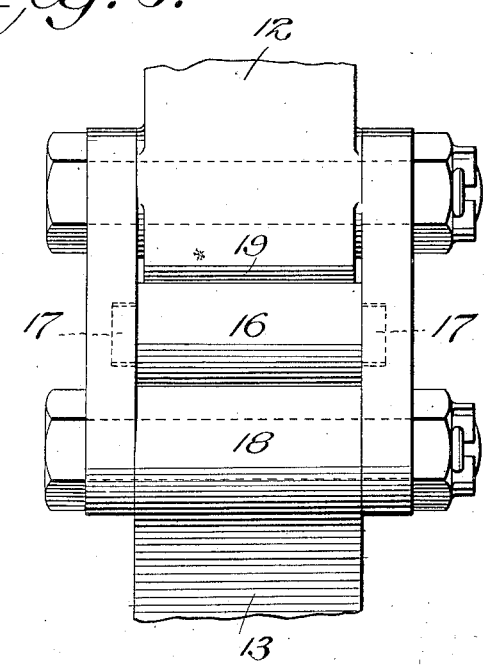
Figure 4:
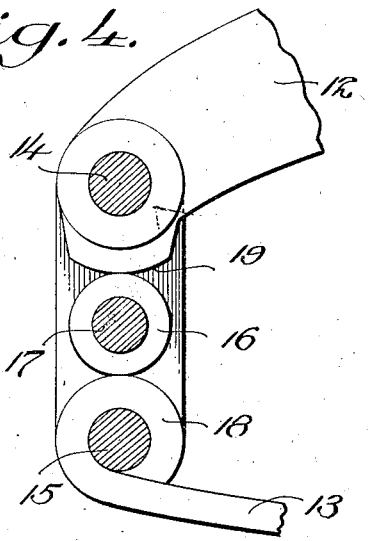

Figure 1 is a perspective of an ordinary form of spring-shackle the disadvantages in connection with which it is the purpose of my invention to avoid;

Figure 2, a view of a worn strap member and its associated bolts;

Figure 3, an end view of a preferred form of spring-shackle constructed in accordance with my invention;

Figure 4, a sectional view of the structure shown in Figure 3;

Figure 5, a view similar to Figure 3 of a modified form of spring shackle embodying the novel and essential characteristics of my invention;

Figure 6, a sectional view of the structure shown in Figure 5;

Figure 7, a view similar to Figure 5 of a further modified form of spring-shackle;

Figure 8, a sectional view of the structure shown in Figure 7; and

Figure 9, a view similar to Figure 5 of still another modified form of spring-shackle.

In Figure 1 of the drawings I have illustrated a spring-shackle of well known and extensively used construction for connecting semi-elliptic springs to vehicle frames, while in Figure 2 I have illustrated certain parts of the structure of Figure 1 to show the disadvantages thereof which are overcome by my improvements.

A spring shackle of the form illustrated in Fig. 1 consists of a pair of strap members 10 and 11 arranged upon opposite sides of the frame 12 of a vehicle and its supporting semi-elliptic spring 13 and having bolts 14 and 15 passed therethrough and through the frame and spring, respectively, whereby the spring is flexibly connected to the frame.

It is well known that a semi-elliptic spring has a tendency to straighten out or distend longitudinally under load and to contract or resume its normal shape when the load is removed, and that in addition to and during distension and contraction its ends have rotary or angular movement with respect to the strap members. The shackle shown is for the purpose of accommodating these movements and therefore has pivotal connection with the frame to allow the spring to distend and contract, and has pivotal connection with the spring to permit the end of the latter to rotate and thus accommodate relative angular movements between the spring and straps, the respective pivotal connections being about the bolts 14 and 15.

As a spring-shackle is constantly subjected to severe loads and as it is practically always in motion to compensate for spring movements, it soon wears and is a fertile source of rattling noise, and as the wear becomes excessive, it is dangerous to depend upon the shackle for continued use. To reduce the effects of wear it has been a common practice heretofore to harden the bolts 14 and 15 and to provide bushings therefor where they extend through the frame and spring, but despite these provisions both the bolts and bushings ultimately wear and must be replaced. Regardless of whether bushings are or are not provided, however, the principal amount of wear occurs in the strap members 10 and 11 and in the bolts 14 and 15 at the points where the latter contact with the strap members. This is apparent and is due to the fact that the strap members are substantially at all times acting in compression to support the weight of the load on the spring and to the fact that the compressive stress on the strap members is transmitted directly to the bolts. The wear thus caused by relative movement of the strap members and bolts results in elongation of the bolt receiving openings in the strap members and in depressions being formed in the bolts, as clearly shown in Figure 2, which weakens the shackle, permits its elements to play and rattle, and renders its continued use dangerous.

A preferred form of my invention for overcoming the disadvantages enumerated in the foregoing is illustrated in Figures 3 and 4 of the drawings and consists fundamentally in disposing a compression member between the frame and spring whereby the supporting force of the latter is transmitted directly to the frame instead of through the strap members and bolts so that the latter are relieved of compressive stress and all wear on the shackle is substantially eliminated. The compression member shown is in the form of a roller 16 having rolling contact with surfaces of the spring and frame, respectively, which are concentric with the bolts or pivots 14 and 15, whereby deflections of the spring and angular or rotary movements thereof with respect to the strap members are accommodated. In the embodiment of the invention shown in Figures 3 and 4 the roller is provided with end trunnions 17 which are received in recesses in the inner faces of the strap members 10 and 11, by which means it is retained by the shackle in alinement with the bolts or pivots 14 and 15, so as to contact with the rolled eye 18 in the end of the spring which receives the bolt 15, and with a surface 19 of the frame that is directly beneath the bolt 14 and concentric therewith. As the angular movement of the spring with respect to the straps is greater than the angular movement of the straps with respect to the frame due to the aforementioned tendency of the spring to straighten out when distended, it is manifest that if the roller 16 is concentric the contact surface 19 must be struck from a greater radius than the contacting surface of the eye 18 in order to allow the roller to have anti-friction rolling contact with both the frame and spring and at the same time retain the roller by the straps. In constructing the frame I therefore form a boss thereon directly beneath the opening which receives the bolt 14 and machine this boss concentric with said opening on a predetermined radius which will compensate for the aforementioned differences in the degree of angular movements of the parts.

By the provision of an arrangement such as the foregoing it is apparent that all compressive stress is relieved from the straps and bolts and that the supporting force of the spring is transmitted directly to the frame by a member which has relatively broad or extensive rolling contact with each. This permits the elimination of bushings and the use of soft bolts instead of hardened ones, and also permits the use of a roller of soft or unhardened material, while at the same time lubrication of the shackle becomes relatively unimportant, and the longevity of the latter is assured.

In Figures 5 and 6 of the drawings I have illustrated a modification of my invention which consists in eliminating the boss on the frame and forming the roller with cylindrical portions 20, 21 of different diameters which contact respectively with the eye of the spring and the usual curved under face of the frame which is concentric with the upper bolt 14, the larger portion of the roller being arranged to bear on the spring and the smaller portion on the frame whereby the aforementioned differences in the angular movement of the parts of the shackle are compensated. In other respects this form of my invention is a duplicate of the form just described.

In Figures 7 and 8 of the drawings I have illustrated a further modification of my invention in which the compression member is formed with rolling surfaces 21, 22 struck, respectively, from greater and less radii and arranged to contact, respectively, with the eye of the spring and the usual under surface of the frame which is concentric with the upper bolt 14. The only difference in this arrangement over that shown in Figures 5 and 6 resides in the fact that both surfaces 21, 22 of the compression member are in full contact with the spring and frame, respectively, throughout their width, whereas in the structure shown in Figures 5 and 6 the compression member is only in partial contact with both the frame and spring. The compression member shown in Figures 7 and 8 is of substantially inverted V-shape in cross section and is therefore provided with lips or limit stops 23 adapted to contact with the eye of the spring to prevent it from becoming accidentally displaced with respect to the surfaces with which it contacts.

In Figure 9 of the drawings I have illustrated a still further modification of my invention which is similar in all substantial respects to the preferred form illustrated in Figures 3 and 4, but which includes additions to said preferred form as follows:— First, the roller 16' is corrugated so as to be self-cleaning of dust, dirt and other foreign matter; second, the trunnions 17' are extended through the side straps and provided with nuts 24 which maintain the entire shackle in assembly, thereby eliminating the use of nuts on the bolts 14', 15', which latter in the present instance are in the form of retaining pins having their ends received in recessess in the inner faces of the strap members; third, the roller is provided with an annular flange 25 which is received in grooves 26 and 27 in the frame and spring, respectively, whereby lateral thrust of the spring is transmitted directly to the frame instead of through the shackle as heretofore. This maintains the rectangular relation of the shackle and permits the use of the nuts 24 to hold the shackle in assembly as is apparent, since the nuts are not subject to stress and act as retaining members only.

In the last and in all of the arrangements disclosed the compression member, instead of being provided with trunnions, may be bored out and a bolt passed therethrough and through the strap members to hold it in place, and likewise the proportions of the structure may be varied to permit the roller to contact directly with the bolts 14 instead of with a portion of the frame concentric therewith, as may be desired in particular instances, but such arrangements although obvious are deemed undesirable at this time and therefore have not been illustrated.

From the foregoing description taken in connection with the accompanying drawings, it is believed that the construction, operation, and advantages of my improvements will be fully understood, and while I have herein illustrated and described certain preferred embodiments of my invention, I desire it to be understood that I include as falling within the scope of my invention all other structures of a like nature included in the terms of the appended claims.

I claim:—

1. The combination with a frame, a supporting spring associated therewith, and a shackle having relatively spaced pivotal connections with the frame and spring, respectively, of an inherently rigid member interposed between the spring and frame acting to transmit the supporting force of the spring to the frame, and to relieve the shackle and said pivotal connections of said supporting force.

2. The combination with a frame, a supporting spring associated therewith, and a shackle having pivotal connections with the frame and spring, respectively, of inherently rigid means acting independent of the shackle to transmit the supporting force of the spring to the frame, whereby said pivotal connections are relieved of stress and resultant wear.

3. The combination with a frame, a supporting spring associated therewith, and a shackle having pivotal connections with the frame and spring, respectively, of an inherently rigid member retained between the spring and frame by said shackle and acting to transmit the supporting force of the spring to the frame, independently of said shackle, whereby said pivotal connections are relieved of stress and resultant wear.

4. In a vehicle, the combination with a frame, a supporting spring associated therewith, and a shackle having pivotal connections with the frame and spring, respectively, one of said pivotal connections having greater relative angular movement than the other; of means disposed between said frame and spring and sustaining the supporting force of the latter, said means having substantially continuous rolling contact with the spring and frame during all angular movements of said pivotal connections.

5. In a vehicle, the combination with a frame, a supporting spring associated therewith, and a shackle having pivotal connections with the frame and spring, respectively, one of said pivotal connections having greater relative angular movement than the other; of a roller disposed between and having surface engagement with surfaces of the spring and frame and acting to sustain the supporting force of the spring, certain of said engaging surfaces having relative radius differentiation to maintain the roller in substantially rolling contact with the spring and frame during all angular movements of said pivotal connections.

6. In a vehicle, the combination with a frame, a supporting spring associated therewith, and a shackle having pivotal connections with the frame and spring, respectively, one of said pivotal connections having greater relative angular movement than the other; of a roller disposed between and having surface engagement with surfaces of the spring and frame and acting to sustain the supporting force of the spring, certain of said engaging surfaces having predetermined radii to maintain the roller substantially in contact with the spring and frame during all angular movements of said pivotal connections.

7. In a vehicle, the combination with a frame, a supporting spring associated therewith, and a shackle having pivotal connections with the frame and spring, respectively, of a member between and having rolling contact with the spring and frame and acting to transmit the supporting force of the spring directly to the frame, said member being carried by the shackle.

8. The combination with a frame, a supporting spring associated therewith, and a shackle having pivotal connection with the frame and spring, respectively, one of said pivotal connections having a greater relative angular movement than the other; of rolling surfaces on the spring and frame having different radii and concentric, respectively, with said pivotal connections, and a cylindrical roller between and bearing against said surfaces, whereby the supporting force of the spring is relieved from said pivotal connections and the differences in the relative angular movement of said pivotal connections are substantially compensated.

9. The combination with a grooved frame, a grooved supporting spring associated therewith, and a shackle connecting said spring to said frame, of a roller disposed between the spring and frame and provided with an annular rib extending into the grooves in the frame and spring, respectively, whereby lateral stress is transmitted from the spring to the frame.

10. In a vehicle, the combination with a frame, a supporting spring associated therewith, and a shackle having pivotal connections with the frame and spring, respectively, one of said pivotal connections having greater relative angular movement than the other; of a member disposed between and including parts in rolling contact with parts of the spring and frame, respectively, and acting to sustain the supporting force of the spring, said contacting parts having relative radius differentiation to maintain the member substantially in rolling contact with the spring and frame during all angular movements of said pivotal connections.

In testimony whereof I hereunto affix my signature.

DORSEY F. ASBURY.